United States Patent [19]

Shimoda et al.

[11] Patent Number: 4,936,621
[45] Date of Patent: Jun. 26, 1990

[54] SPACERS FOR A DOOR STRUCTURE FOR AN AUTOMOBILE

[75] Inventors: Nobuyoshi Shimoda; Hiroshi Tabira, both of Wako, Japan

[73] Assignee: Honda Giken Kogyo Kabushiki Kaisha, Tokyo, Japan

[21] Appl. No.: 238,070

[22] Filed: Aug. 30, 1988

[30] Foreign Application Priority Data

Sep. 10, 1987 [JP] Japan ................. 62-225379

[51] Int. Cl.$^5$ ............................................ B60J 5/04
[52] U.S. Cl. ................................ 296/188; 296/207
[58] Field of Search ............. 296/188, 189, 146, 202, 296/207

[56] References Cited

U.S. PATENT DOCUMENTS

| | | | |
|---|---|---|---|
| 1,729,231 | 9/1929 | Toncray | 296/207 X |
| 1,884,998 | 10/1932 | Perry | 296/207 |
| 3,944,278 | 3/1976 | Takahashi et al. | 296/146 |
| 4,018,475 | 4/1977 | Richtermeier | 296/146 X |
| 4,293,160 | 10/1981 | Lutze et al. | 296/188 |

FOREIGN PATENT DOCUMENTS 61-5265  1/1986  Japan .

Primary Examiner—Margaret A. Focarino
Assistant Examiner—Joseph D. Pape
Attorney, Agent, or Firm—Armstrong, Nikaido, Marmelstein, Kubovcik & Murray

[57] ABSTRACT

Spacers to be installed between the free end surface of a door and the countersurface of the doorpillar to check movement of the door when the door moves relative to the doorpillar toward the countersurface to prevent any contact of the edge of a flange on the door with adjacent structure opposite the edge of the flange. The spacers are sized to reduce the spacing between the free end surface and the countersurface to a distance less than the clearance between the edge of the door flange and the adjacent structure.

4 Claims, 2 Drawing Sheets

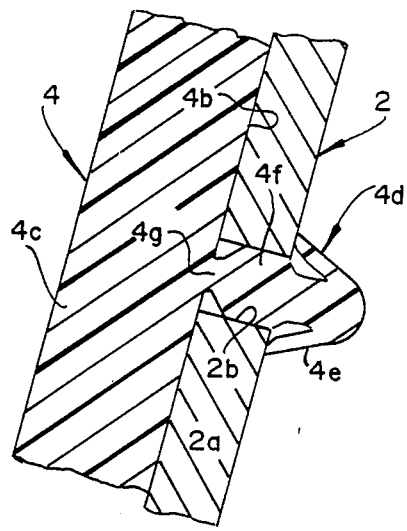
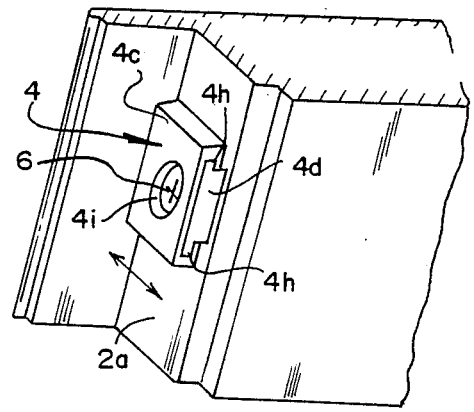
FIG. 3          FIG. 4
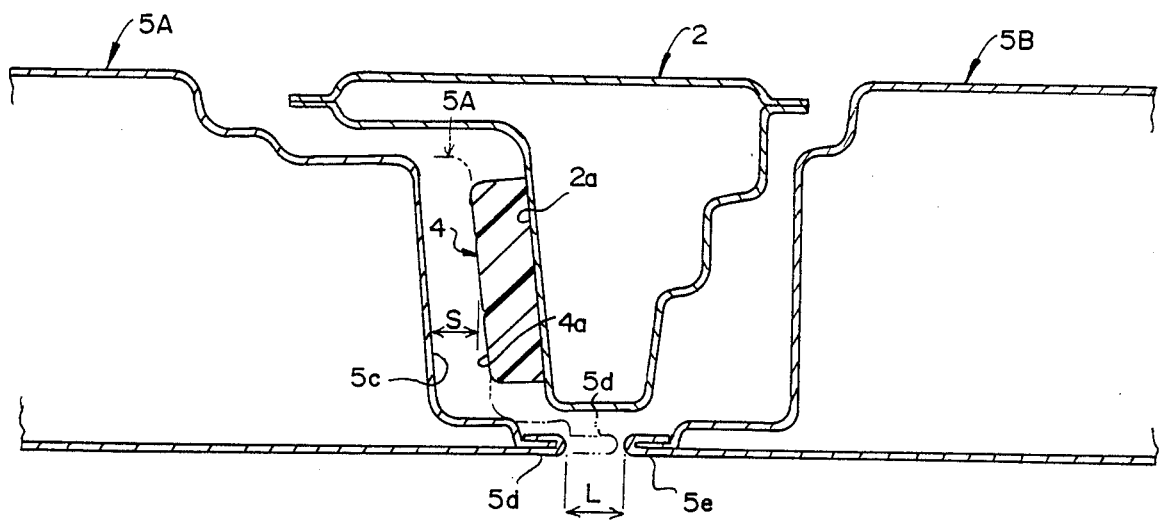
FIG. 5

SPACERS FOR A DOOR STRUCTURE FOR AN AUTOMOBILE

BACKGROUND OF THE INVENTION

The present invention relates to a door structure for an automobile for supporting a hinged door and, more particularly, to a door structure for an automobile constructed so that a minimum gap is formed between the edge of a flange projecting from the free side of the door and the countersurface of a doorpillar.

In some cases, the free side of the hinged door of a general passenger car interferes with the counter surface of the doorpillar of the body facing the free side of the door in opening and closing the door due to dimensional errors in the body or assembling errors in attaching the door to the body. Accordingly, it is necessary to form a clearance between the free side of the door and the countersurface of the doorpillar to compensate for such errors. Since the door has a comparatively large thickness, the clearance allowing the free opening and closing of the door must be comparatively large, which spoils the aesthetic appearance of the body. Ordinarily, a flange projects from the free side of the door to cover this clearance and the door structure is designed so that a minimum clearance is formed between the edge of the flange and a countermember of the doorpillar or that of the adjacent door.

The body can be distorted by a collision causing the door to be dislocated toward the doorpillar. In such a case, the edge of the flange of the door is caused to hit against the corresponding countermember before the free side of the door comes into collision with the corresponding countersurface of the doorpillar when a minimum clearance is formed between the edge of the flange of the door and the corresponding countermember. For example, in a door structure having a door disposed with the edge of the flange thereof opposite the doorpillar of the body, the flange of the door will be pressed against the doorpillar to distort the flange and the doorpillar when the door is dislocated by a collision. In a four-door automobile, in which the rear edge of the front door and the front edge of the rear door are positioned opposite to each other, a flange formed in the rear end of the front door and a flange formed in the front end of the rear door hit against each other by a collision and thereby both the flanges are deformed.

Deformation of both the flange of the door and the corresponding countermember requires additional cost for repair and increases the expense for repairing the door and the doorpillar.

To eliminate those disadvantages of the conventional door structure, Japanese Utility Model Laid-open (Kokai) No. 61-5265 discloses a door structure including a front door hinged at the front end thereof and having a free rear end formed with an inclined sliding surface declining to the rear, and a center pillar having a front sliding surface declining to the front.

In this known door structure, if the front door is dislocated by a collision due to the distortion of the body, the rear end of the front door is caused to slide outward by a large extend along the sliding surface of the center pillar. Consequently, the collision of a flange formed in the rear end of the front door with a flange formed in the front end of the rear door is obviated, and thereby the deformation of the flanges is prevented.

However, a door locking mechanism, in general, is provided between the rear end of the front door and the center pillar. The door locking mechanism is exposed to a large force which generates an excessive stress in the door locking mechanism, when a large force is applied to the front door to dislocate the front door outward by a large extent.

The present invention has been made in view of those foregoing problems in the conventional door structures. Accordingly, it is an object of the present invention to provide means capable of surely preventing the deformation of the flange of the door and the corresponding countermember, such as the doorpillar and preventing the action of an excessive force on the door locking mechanism, when the door is dislocated toward the doorpillar by a collision.

SUMMARY OF THE INVENTION

To achieve the object of the invention, the present invention provides a door structure including a spacer provided on either the surface of the free end of a door or the countersurface of a doorpillar facing the free end of the door. The spacer checks the movement of the edge of a flange projecting from the free end of the door to a position where the edge of the flange hits against the corresponding member of the doorpillar.

Thus, the spacer is provided between the free end of the door and the countersurface of the doorpillar. The spacer prevents the collision of the edge of the flange of the door with the countermember of the doorpillar even if the door is dislocated relative to the doorpillar toward the countersurface of the doorpillar, and thereby the deformation of the flange of the door and the countermember is obviated.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 3 is an enlarged sectional view showing an essential portion of a spacer attaching structure;

FIG. 4 is a perspective view showing another spacer employed in a door structure, in a second embodiment, according to the present invention; and FIG. 5 is a sectional view, similar to FIG. 2, showing a door structure embodying the present invention incorporated in a four-door automobile.

DETAILED DESCRIPTION OF PREFERRED EMBODIMENTS

A door structure, in a preferred embodiment, according to the present invention will be described hereinafter with reference to the accompanying drawings.

Figure 1:
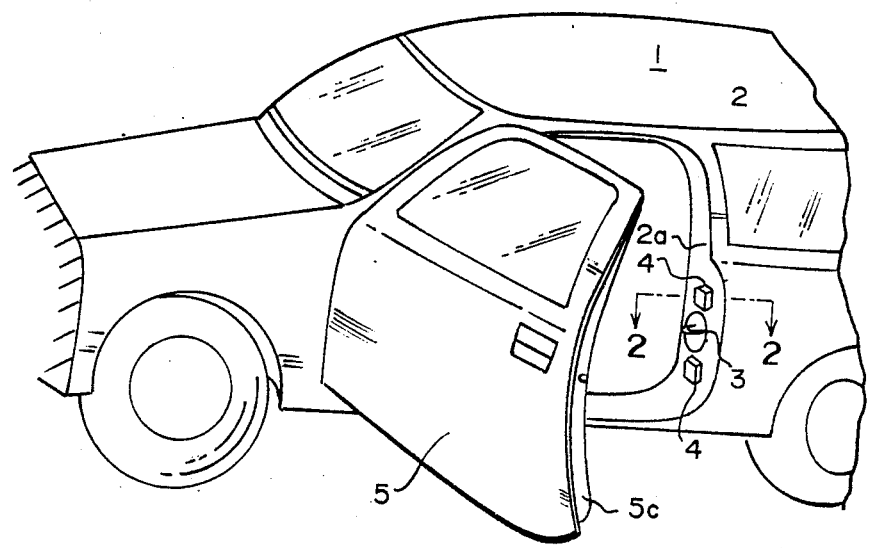
FIG. 1 is a schematic perspective view showing and essential portion of a two-door automobile incorporating a door structure, in a first embodiment, according to the present invention, in which the door is open.
Figure 2:
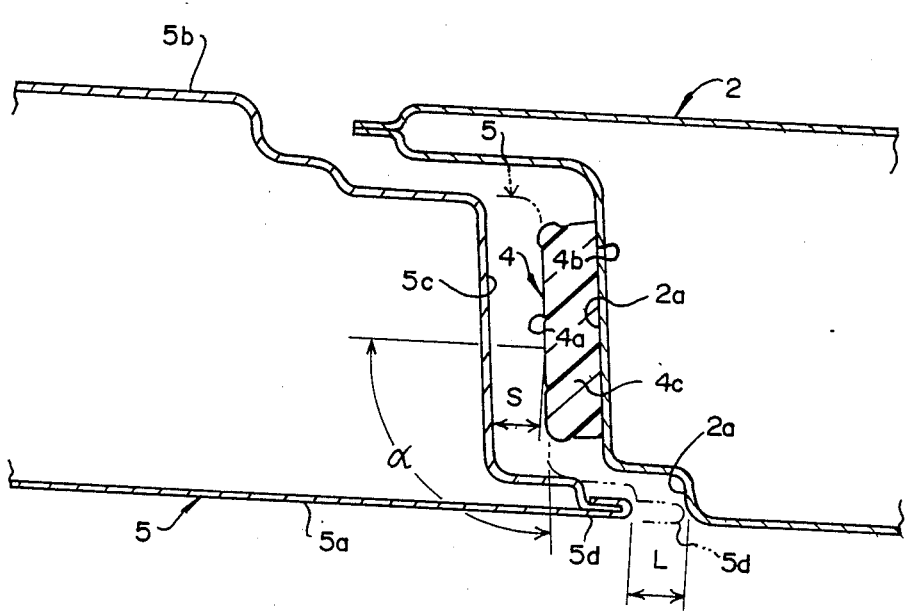
FIG. 2 is a horizontal section view taken on line II—II in FIG. 1, showing a portion provided with a spacer.

FIG. 1 is a schematic fragmentary perspective view showing the left side of the body of a two-door automobile incorporating a door structure embodying the present invention and FIG. 2 is a horizontal sectional view of the door structure of FIG. 1 in a state where the door is closed.

As shown in FIG. 1, a comparatively large door opening 1 is formed in the side of the two-door automobile. The rear end of the door opening 1 is defined by a center pillar 2. A pair of spacers 4 are attached one over the other to the front surface 2a of the center pillar 2. A striker 3, namely, one of the components of a door locking mechanism, is attached to the front surface 2a of the center pillar 2 at a position between the pair of spacers 4.

The opening 1 is closed by a hinged door 5 hinged at the front side thereof for swinging to open or close. As best shown in FIG. 2, the door 5 has an outer panel 5a and an inner panel 5b. The rear end of the inner panel 5b is bent so as to form a rear end surface 5c, namely, the free end surface of the door 5. A flange 5d is formed by the rear end of the outer panel 5a and the rearward extension of the outer portion of the rear end surface 5c. The edge of the flange 5d is finished by hemming.

When the door 5 is closed, a predetermined clearance S with respect to he longitudinal direction of the automotive body is formed between the respective flat front surfaces 4a of the spacers 4 and the rear end surface 5c of the door 5. A clearance L with respect to the longitudinal direction of the automotive body is formed between the edge of the flange 5d of the door 5 and the front surface 2a of the center pillar 2. The clearance L is a minimum clearance between the door 5 and the center pillar 2. The clearance S is smaller than the minimum clearance L. Since the spacers 4 are individual members, the spacers 4 can be attached to the center pillar 2 after mounting the door 5 on the automotive body and adjusting the door 5. Accordingly, the clearance S can be adjusted to a value smaller than the clearance L.

Generally, the rear end surface 5c of the door 5, and the front surface 2a of the center pillar 2 are inclined so that the inner portion of each of the rear end surface 5c and the front surface 2a is positioned slightly before the outer position of the same to enable the door 5 to swing on the hinges for opening and closing. Hence, the flat front surfaces 4a of the spacers 4 are inclined accordingly. It is desirable that the inclination a of the front surfaces 4a of the spacers 4 with respect to the longitudinal axis of the automotive body is in a range defined by $90° < a < 105°$, in order that the rear end of the door 5 will not be dislocated great outward to twist the door locking mechanism provided between the rear end of the door 5 and the center pillar 2 when the rear end surface 5c of the door 5 is brought into contact with the front surfaces 4a of the spacers 4a.

Furthermore, the front surfaces 4a which are to be in contact with the rear end surface 5c of the door 5 when the door is dislocated rearward, and the rear surfaces 4b of the spacers 4 which are in contact with the center pillar 2 must have a comparatively large area sufficient to prevent the spacers 4 from sinking in the door 5 or the center pillar 2 when the spacers 4 are pressed by the rear end surface 5c of the door 5. Although dependent on colliding speed and the rigidity of the automotive body, it was confirmed through tests that the necessary area of each of the front surfaces 4a and rear surfaces 4b of the spacers 4 is on the order of 10 $cm^2$ for ordinary passenger cars.

The spacers 4 are formed of a material having a comparatively small coefficient of friction, such as hard polyethylene, in order that the rear end surface 5c of the door 5 is able to slide easily along the front surfaces 4a of the spacers 4 in opening the door 5 when the rear end surface 5c of the door 5 is in contact with the front surfaces 4a of the spacers 4.

Still further, when a frictional force higher than a predetermined level is applied to the front surfaces 4a of the spacers 4 by the rear end surface 5c of the door 5 in opening the door 5, the spacers 4 are removed from the center pillar 2.

FIG. 3 is a lateral sectional view of the spacer 4, showing an arrangement for allowing the spacer 4 to be removed from the center pillar 2.

The spacer 4 shown in FIG. 3 has a body 4c, and a leg 4d formed integrally with the body 4c so as to project from the rear surface 4b thereof. The leg 4d has fins 4e at the extremity thereof, a stem 4f forming the middle portion thereof and having a diameter substantially the same as that of a hole 2b formed in the center pillar 2, and a neck 4g at the root thereof. The neck 4g can easily be sheared off by a shearing stress exceeding a fixed level resulting from a force exerted on the body 4c in the direction of the front surface 4a. When the neck 4g is sheared off, the leg 4e is separated from the body 4c, and thereby the body 4c is allowed to move in the direction of action of the force relative to the center pillar 2.

The spacer 4 thus formed is attached to the center pillar 2 by pressing the leg 4d into the hole 2b of the center pillar 2 so that the body 4c and the fins 4e hold fast respectively to the opposite surfaces around the hole 2b of the center pillar 2.

The function of the door structure thus constituted will be described hereinafter.

When the automobile comes into a head-on collision with an obstacle or another automobile, the body, particularly, the front portion of the body, is deformed to dislocate the door 5 rearward, namely, toward the front surface 2a of the center pillar 2. Then, the rear end surface 5c of the door 5 is pressed first against the front surfaces 4a of the spacers 4 as indicated by alternate long and two short dashes lines in FIG. 2. In this state, the edge of the flange 5d of the door 5 is not in contact with the front surface 2a of the center pillar 2, because the clearance S between the rear end surface 5c of the door 5 and the front surfaces 4a of the spacers 4 is smaller than the minimum clearance L between the edge of the flange 5d of the door 5 and the front surface 2a of the center pillar 2. Since the front surfaces 4a of the spacers 4 are in contact with the door 5, and the rear surfaces 4b of the same in contact with the center pillar 2 have a sufficiently large area, the stress is distributed over the large area and hence the spacers 4 sink scarcely in the door 5 or the center pillar 2. Accordingly, the edge of the flange 5d of the door 5 does not come into contact with the center pillar 2. Consequently, the deformation of the flange 5d and the center pillar 2 is prevented. Furthermore, since the inclination a of the front surfaces 4a of the spacers 4 is decided properly as mentioned above, the outward dislocation of the rear end of the door 5 is small. Accordingly, the door locking mechanism is not exposed to an excessive force.

In this state, in which the rear end surface 5c of the door 5 is pressed against the front surfaces 4a of the spacers 4, the rear end of the door 5 can easily be moved outward by a comparatively small opening force, that is, the door 5 can easily be opened by a comparatively small opening force, because the frictional resistance of the front surfaces 4a of the spacers 4 against the movement of the rear end surface 5c of the door 5 relative to the spacers 4 is comparatively small since the spacers 4 are formed of a material having a small coefficient of friction, and because the front surfaces 4a of the spacers 4 are inclined.

When the rear end surface 5c of the door 5 is pressed very firmly against the spacers 4 and hence the frictional resistance of the front surfaces 3a against the movement of the rear end surface 5c of the door relative to the spacers 4 is very large, a considerably large opening force must be applied to the door 5 to open the same. Such a large opening force for opening the door 5 is transmitted through the rear end surface 5c of the door 5 and the front surfaces 4a of the spacers 4 to the bodies 4c of the spacers 4. When a shearing stress resulting from the opening force applied to the door 5 and acting on the necks 4g of the spacers 4 exceeds a fixed level, the necks 4g of the spacers 4 are sheared off to enable the bodies 4c of the spacers to slide relative to the center pillar 2. Consequently, the body 4c of the spacers 4 moves outward together with the rear end surface 5c of the door 5, so that the door 5 can easily be opened. Accordingly, the opening force to be applied to the door 5 to open the same is always smaller than a fixed value.

FIG. 4 is a perspective view of a spacer 4 of another arrangement for allowing the spacer 4 to be removed from the center pillar 2, incorporated into a door structure, in a second embodiment, according to the present invention.

Referring to FIG. 4, this spacer 4 comprises a body 4c and a base 4d separate from the body 4c. The base 4d is fixed firmly to the front surface 2a of the center pillar 2 with a screw 6. The upper and lower end of the front surface of the base 4d are extended to form flanges 4h extending respectively upward and downward. On the other hand, the body 4c has a substantially C-shaped cross section and is provided in the upper and lower end thereof with grooves respectively for receiving the flanges 4h therein and a through hole 4i in the central portion thereof for receiving a screw driver therethrough to turn the screw 6. The body 4c is pushed in a direction across the automotive body so as to receive the flanges 4h in the grooves thereof. When a lateral stress exceeding a fixed level is applied to the body 4c in directions indicated by a double-head arrow in FIG. 4, the body 4c slides relative to the base 4.

The function of the door structure, in the second embodiment, according to the present invention will be described hereinafter.

Function of the door structure is the same as that of the first embodiment when the door 5 can be opened by a comparatively small opening force, and hence the description of the same will be omitted.

When an opening force higher than a fixed level is necessary to open the door 5, the opening force transmitted to the body 4c causes the body 4c to slide outward against the frictional resistance of the base 4d. Accordingly, in this case, similarly to the foregoing case, the door 5 can surely be opened.

FIG. 5 is a sectional view, similar to FIG. 2, showing a door structure embodying the present invention incorporated into a four-door automobile, in which the rear edge of a front door 5A is disposed opposite the front edge of a rear door 5B.

As is obvious from FIG. 5, spacers 4 are fixed to the front surface 2a of a center pillar 2 provided between the front door 5A and the rear door 5B, facing the rear end surface 5c of the front door 5A. A clearance S with respect to the longitudinal direction between the rear end surface 5c and the front surfaces 4a of the spacers 4 is smaller than a minimum clearance L between the rear edge of the flange 5d of the front door 5A and the front edge of the flange 5e of the rear door 5B.

The function of the door structure shown in FIG. 5 will be described hereinafter.

When the front door 5a is caused to be dislocated rearward by the collision of the automobile with an obstacle or another automobile, the rear end surface 5c of the front door 5A comes into contact with the front surfaces 4a of the spacers 4 as indicated by alternate long and two short dashes lines in FIG. 5. However, the rear edge of the flange 5d of the front door 5A is not in contact with the front edge of the flange 5e of the rear door 5B. Accordingly, the flange 5d of the front door 5A and the flange 5e of the rear door 5B are not deformed. Furthermore, since an excessive stress is not exerted to the door locking mechanism, the doors can be unlocked.

Although the spacers 4 are provided on the pillar of the automotive body in the foregoing embodiment, the spacers 4 may be provided on the doors 5 and 5A or on both the pillar and the doors 5 and 5A. Attaching spacers having a warning reflective function on the door are useful to warn the driver of the following automobile when the door is opened that the door is open.

Furthermore, although the doors 5, 5A and 5B are those hinged respectively at the front ends thereof, the present invention is applicable also to doors hinged respectively at the rear ends. In the latter case, the spacers 4 are provided on the rear surface of the pillar of the automotive body.

Still further, spacers 4 having a sufficiently small coefficient of friction may simply be screwed to the pillar 2 or attached adhesively to the pillar 2 by an adhesive. In such a case, the mechanisms allowing the spacers 4 to be removed from the pillar 2 as shown in FIGS. 3 and 4 may be omitted.

Furthermore, although a pair of spacers 4 are provided for each door in the foregoing embodiments, the number of the spacers 4 may be varied according to the type of automobile.

Moreover, the present invention is effective in the case of a collision from behind as well as a head-on collision.

As apparent from the foregoing description, according to the present invention, spacers are provided on the end surface of the free end of a door or on the countersurface of a pillar facing the end surface of the free end of the door so that the end surface of the free end of the door comes into contact with the spacers before the edge of a flange projecting from the free end of the door reaches a member corresponding to the edge of the flange when the door is dislocated toward the countersurface of the pillar. Accordingly, the collision of the flange of the door against the corresponding member is prevented, and thereby the flange of the door and the corresponding member are not deformed. Consequently, additional repair work is eliminated to avoid increase in the repair cost.

Furthermore, since the movement of the door toward the pillar of the automotive body can simply be checked, an excessive stress is never exerted on the door locking mechanism.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. In an automobile having hinged doors hinged for swinging to open and close and provided each with a flange projecting from the free side thereof, and doorpillars formed integrally with an automotive body and each having a countersurface facing the free side of the corresponding hinged door; a door structure comprising spacers for checking the movement of the door when the door moves relative to the doorpillar toward the countersurface so that the door is unable to move beyond a position prior to contact between the edge of the flange of the door with a member disposed opposite the edge of the flange, said spacers being provided at least on either one of the surface of the free side of the door and the countersurface of the doorpillar, said spacers including means for permitting aid spacers to separate form the surface they are provided on upon receiving a lateral stress exceeding a fixed level, said spacers each comprising a body ad a leg formed integrally with said body so as to project from a rear surface thereof, said leg having holding means at a distal end thereof and a reduced diameter neck adjacent the rear surface of the body, and said means for permitting said spacers to separate comprising a further reduced diameter portion at said neck.

2. In an automobile having hinged doors for swinging to open and close and provided each with a flange projecting from the free side thereof with a certain clearance between the edge of the flange and an adjacent structure in the longitudinal direction of the automobile with the door closed, and doorpillars formed integrally with an automotive body and each having a countersurface facing the free side of the corresponding hinged door; a door structure comprising spacers provided at least on one of the surface of the free side of the door and the countersurface of the doorpillar, said spacers being sized to reduce the spacing between the surface of the free side of the door and the countersurface of the doorpillar to a distance less than said certain clearance, said spacers including means for permitting said spacers to separate from the surface they are provided on upon receiving a lateral stress exceeding a fixed level, said spacers each comprising a body and a leg formed integrally with said body so as to project from a rear surface thereof, said leg having holding means at a distal end thereof and a reduced diameter neck adjacent the rear surface of the body, and said means for permitting said spacers to separate comprising a further reduced diameter portion at said neck.

3. The door structure as claimed in claim 1, wherein said spacers are made of hard polyethylene.

4. The door structure as claimed in claim 2, wherein said spacers are made of hard polyethylene.

* * * * *